United States Patent [19]

Mak

[11] Patent Number: 5,486,805
[45] Date of Patent: Jan. 23, 1996

[54] METHOD OF RECEIVING UNSOLICITED MESSAGES ON AN ELECTRICAL DISTRIBUTION NETWORK COMMUNICATIONS SYSTEM

[75] Inventor: Sioe T. Mak, Chesterfield, Mo.

[73] Assignee: Distribution Control Systems, Inc., St. Louis, Mo.

[21] Appl. No.: 86,085

[22] Filed: Jul. 6, 1993

[51] Int. Cl.$^6$ .......................... H04M 11/04; G08B 1/08; H04Q 1/30
[52] U.S. Cl. ....................... 340/310.06; 340/538; 307/38
[58] Field of Search .................... 340/310.01, 310.02, 340/310.06, 538, 825.08, 825.12, 825.13; 375/36, 37; 307/38

[56] References Cited

U.S. PATENT DOCUMENTS

| | | | |
|---|---|---|---|
| 4,367,414 | 1/1983 | Miller et al. | 307/38 |
| 4,644,566 | 2/1987 | Vercellotti et al. | 340/310.01 |
| 4,885,564 | 12/1989 | Vercellotti et al. | 340/538 |
| 5,061,922 | 10/1991 | Nishijima et al. | 340/310.06 |

*Primary Examiner*—Victor R. Kostak
*Assistant Examiner*—John W. Miller

*Attorney, Agent, or Firm*—Polster, Lieder, Woodruff & Lucchesi

[57] ABSTRACT

A two-way communication system (TWACS) used with an electrical power distribution network N. The TWACS provides both outbound and inbound messages to and from remote network locations. A method of detecting and decoding unsolicited inbound messages from remote locations first involves generating the message in response to a time independent event occurring at the remote location. Formation of the message includes both generating a series of message bits, each of which has a prescribed format, and affixing a preamble to the front end of the message which comprises a plurality of bits arranged in a predetermined pattern. The message is then transmitted over any one of a plurality of communication channels n normal used for two-way communications. Since the event triggering the unsolicited inbound message is independent of time, the time of transmission is random. The message is received at a receiving site, receipt of the message including receipt of the bits comprising the prefix together with bits comprising the message. The bits forming the preamble are detected, their detection signalling the fact an unsolicited message is being received. Preamble bit detection also initiate synchronization of operation of the TWACS to decode the contents of the message.

12 Claims, 9 Drawing Sheets

```
                 1      0       0      -1      0      -1      1      0
```

```
                                    ┌── start of inbound
Residues                            │─── bit "0" ───────┤─── bit "1" ───┐
              0  0  0  0  0  0  0  0│ 0 -1  1  0  1  0  0 -1│ 1  0  0 -1  0 -1  1  0
     0              6  0 -2  0 -2  0 -2│ 0
     0                 6  0 -2  0 -2  0│-2  0
     2                    6  0 -2  0 -2│ 0 -2  0
    -2                       6  0 -2  0│-2  0 -2  0
     2                          6  0 -2│ 0 -2  0 -2  0
    -4                             6  0│-2  0 -2  0 -2  0
     2                                6│ 0 -2  0 -2  0 -2  0
    -4                                 │ 6  0 -2  0 -2  0 -2  0
    -4                                 │    6  0 -2  0 -2  0 -2│ 0
     2                                 │       6  0 -2  0 -2. 0│-2  0
     2                                 │          6  0 -2  0 -2│ 0 -2  0
     4                                 │             6  0 -2  0│-2  0 -2  0
     4                                 │                6  0 -2│ 0 -2  0 -2  0
    -2                                 │                   6  0│-2  0 -2  0 -2  0
    -2                                 │                      6│ 0 -2  0 -2  0 -2  0
     4                                 │                       │ 6  0 -2  0 -2  0 -2  0
```

```
P1(0,1)  = [ 0  0  0  0  0  0  0 -1  1 -1  1  0  0  0  0  1 ]
P6(0,1)  = [ 0  0  0  0  0  0  0 -1  1  0  0 -1  1  0  0  1 ]
P9(0,1)  = [ 0  0  0  0  0 -1  1 -1  1  0  0  1 -1  0  0  1 ]
P12(0,1) = [ 0  0  0  0  0  1  0  1 -1 -1 -1 -1  0  0  0  1 ]
P14(0,1) = [ 0  0  0  0  0  0  0  1 -1 -1  0  0 -1 -1  0  1 ]
P15(0,1) = [ 0  0  0  0  0 -1  0 -1 -1  0  0  1  1  0  0  1 ]
```

```
BIT PATTERN :     1 1 1 1 1 1 1 1 1
CHANNEL SET :     A
DSYNCH      :    [  6   0  -2   0  -2   0  -2   0 ]
    0     111111111 111111111 111111111 111111111 111111111 111111111
    1     111111111 111111111 000000000 000000000 000000000 111111111
    2     000000000 000000000 111111111 000000000 000000000 111111111
    3     111111111 000000000 111111111 000000000 111111111 000000000
    4     000000000 111111111 000000000 000000000 111111111 000000000
    5     000000000 111111111 111111111 111111111 000000000 000000000

BIT PATTERN :     1 1 1 1 1 1 1 1 1
CHANNEL SET :     B
DSYNCH      :    [  6   0  -2   0  -2   0  -2   0 ]
    0     111111111 111111111 111111111 111111111 111111111 111111111
    1     111111111 111111111 000000000 000000000 111111111 000000000
    2     000000000 000000000 111111111 000000000 111111111 000000000
    3     000000000 111111111 111111111 111111111 000000000 000000000
    4     000000000 111111111 000000000 000000000 000000000 111111111
    5     111111111 000000000 111111111 000000000 000000000 111111111

BIT PATTERN :     1 1 1 1 1 1 1 1 1
CHANNEL SET :     C
DSYNCH      :    [  6   0  -2   0  -2   0  -2   0 ]
    0     111111111 111111111 111111111 111111111 111111111 111111111
    1     000000000 111111111 111111111 111111111 000000000 000000000
    2     000000000 000000000 111111111 000000000 111111111 000000000
    3     111111111 111111111 000000000 000000000 111111111 000000000
    4     000000000 111111111 000000000 000000000 000000000 111111111
    5     111111111 000000000 111111111 000000000 000000000 111111111

BIT PATTERN :     1 1 1 1 1 1 1 1 1
CHANNEL SET :     D
DSYNCH      :    [  6   0  -2   0  -2   0  -2   0 ]
    0     111111111 111111111 111111111 111111111 111111111 111111111
    1     111111111 000000000 111111111 000000000 111111111 000000000
    2     000000000 000000000 111111111 000000000 000000000 111111111
    3     111111111 111111111 000000000 000000000 000000000 111111111
    4     000000000 111111111 000000000 000000000 111111111 000000000
    5     000000000 111111111 111111111 111111111 000000000 000000000

BIT PATTERN :     1 1 1 1 1 1 1 1 1
CHANNEL SET :     E
DSYNCH      :    [  6   0  -2   0  -2   0  -2   0 ]
    0     111111111 111111111 111111111 111111111 111111111 111111111
    1     111111111 111111111 000000000 000000000 111111111 000000000
    2     000000000 111111111 000000000 000000000 000000000 111111111
    3     000000000 111111111 111111111 111111111 000000000 000000000
    4     000000000 000000000 111111111 000000000 111111111 000000000
    5     111111111 000000000 111111111 000000000 000000000 111111111

BIT PATTERN :     1 1 1 1 1 1 1 1 1
CHANNEL SET :     F
DSYNCH      :    [  6   0  -2   0  -2   0  -2   0 ]
    0     111111111 111111111 111111111 111111111 111111111 111111111
    1     000000000 111111111 111111111 111111111 000000000 000000000
    2     000000000 111111111 000000000 000000000 000000000 111111111
    3     111111111 111111111 000000000 000000000 111111111 000000000
    4     000000000 000000000 111111111 000000000 111111111 000000000
    5     111111111 000000000 111111111 000000000 000000000 111111111
```

FIG. 8.

```
BIT PATTERN :    1 0 1 0 1 0 1 0 1 0
CHANNEL SET :    A
DSYNCH      :  [  6   0  -2   0  -2   0  -2   0 ]
    0    010101010 010101010 010101010 010101010 010101010 010101010
    1    101010101 101010101 010101010 010101010 010101010 101010101
    2    010101010 010101010 101010101 010101010 010101010 101010101
    3    ********* 010101010 101010101 ********* 101010101 010101010
    4    ********* 101010101 010101010 ********* 101010101 010101010
    5    010101010 101010101 101010101 101010101 010101010 010101010

BIT PATTERN :    1 0 1 0 1 0 1 0 1 0
CHANNEL SET :    B
DSYNCH      :  [  6   0  -2   0  -2   0  -2   0 ]
    0    010101010 010101010 010101010 010101010 010101010 010101010
    1    101010101 101010101 010101010 010101010 101010101 010101010
    2    010101010 010101010 101010101 010101010 101010101 010101010
    3    010101010 ********* 101010101 101010101 010101010 *********
    4    ********* 101010101 010101010 ********* 010101010 101010101
    5    101010101 010101010 101010101 010101010 010101010 101010101

BIT PATTERN :    1 0 1 0 1 0 1 0 1 0
CHANNEL SET :    C
DSYNCH      :  [  6   0  -2   0  -2   0  -2   0 ]
    0    010101010 010101010 010101010 010101010 010101010 010101010
    1    010101010 101010101 101010101 101010101 010101010 010101010
    2    010101010 010101010 101010101 010101010 101010101 010101010
    3    101010101 ********* 010101010 010101010 101010101 *********
    4    ********* 101010101 010101010 ********* 010101010 101010101
    5    101010101 010101010 101010101 010101010 010101010 101010101

BIT PATTERN :    1 0 1 0 1 0 1 0 1 0
CHANNEL SET :    D
DSYNCH      :  [  6   0  -2   0  -2   0  -2   0 ]
    0    010101010 010101010 010101010 010101010 010101010 010101010
    1    101010101 010101010 101010101 010101010 101010101 010101010
    2    010101010 010101010 101010101 010101010 010101010 101010101
    3    ********* 101010101 010101010 ********* 010101010 101010101
    4    ********* 101010101 010101010 ********* 101010101 010101010
    5    010101010 101010101 101010101 101010101 010101010 010101010

BIT PATTERN :    1 0 1 0 1 0 1 0 1 0
CHANNEL SET :    E
DSYNCH      :  [  6   0  -2   0  -2   0  -2   0 ]
    0    010101010 010101010 010101010 010101010 010101010 010101010
    1    101010101 101010101 010101010 010101010 101010101 010101010
    2    010101010 101010101 010101010 010101010 010101010 101010101
    3    010101010 ********* 101010101 101010101 010101010 *********
    4    ********* 010101010 101010101 ********* 101010101 010101010
    5    101010101 010101010 101010101 010101010 010101010 101010101

BIT PATTERN :    1 0 1 0 1 0 1 0 1 0
CHANNEL SET :    F
DSYNCH      :  [  6   0  -2   0  -2   0  -2   0 ]
    0    010101010 010101010 010101010 010101010 010101010 010101010
    1    010101010 101010101 101010101 101010101 010101010 010101010
    2    010101010 101010101 010101010 010101010 010101010 101010101
    3    101010101 ********* 010101010 010101010 101010101 *********
    4    ********* 010101010 101010101 ********* 101010101 010101010
    5    101010101 010101010 101010101 010101010 010101010 101010101
```

FIG. 9.

```
BIT PATTERN :    1 1 0 1 0 0 1 0 1 1
CHANNEL SET :    A
DSYNCH      :  [  6   0  -2   0  -2   0  -2   0 ]
    0   101001011  101001011  101001011  101001011  101001011  101001011
    1   110100101  110100101  001011010  001011010  001011010  110100101
    2   001011010  001011010  110100101  001011010  001011010  110100101
    3   1***0***1  001011010  110100101  0***1***0  110100101  001011010
    4   0***1***0  110100101  001011010  0***1***0  110100101  001011010
    5   001011010  110100101  110100101  110100101  001011010  001011010

BIT PATTERN :    1 1 0 1 0 0 1 0 1 1
CHANNEL SET :    B
DSYNCH      :  [  6   0  -2   0  -2   0  -2   0 ]
    0   101001011  101001011  101001011  101001011  101001011  101001011
    1   110100101  110100101  001011010  001011010  110100101  001011010
    2   001011010  001011010  110100101  001011010  110100101  001011010
    3   001011010  1***0***1  110100101  110100101  001011010  0***1***0
    4   0***1***0  110100101  001011010  0***1***0  001011010  110100101
    5   110100101  001011010  110100101  001011010  001011010  110100101

BIT PATTERN :    1 1 0 1 0 0 1 0 1 1
CHANNEL SET :    C
DSYNCH      :  [  6   0  -2   0  -2   0  -2   0 ]
    0   101001011  101001011  101001011  101001011  101001011  101001011
    1   001011010  110100101  110100101  110100101  001011010  001011010
    2   001011010  001011010  110100101  001011010  110100101  001011010
    3   110100101  1***0***1  001011010  001011010  110100101  0***1***0
    4   0***1***0  110100101  001011010  0***1***0  001011010  110100101
    5   110100101  001011010  110100101  001011010  001011010  110100101

BIT PATTERN :    1 1 0 1 0 0 1 0 1 1
CHANNEL SET :    D
DSYNCH      :  [  6   0  -2   0  -2   0  -2   0 ]
    0   101001011  101001011  101001011  101001011  101001011  101001011
    1   110100101  001011010  110100101  001011010  110100101  001011010
    2   001011010  001011010  110100101  001011010  001011010  110100101
    3   1***0***1  110100101  001011010  0***1***0  001011010  110100101
    4   0***1***0  110100101  001011010  0***1***0  110100101  001011010
    5   001011010  110100101  110100101  110100101  001011010  001011010

BIT PATTERN :    1 1 0 1 0 0 1 0 1 1
CHANNEL SET :    E
DSYNCH      :  [  6   0  -2   0  -2   0  -2   0 ]
    0   101001011  101001011  101001011  101001011  101001011  101001011
    1   110100101  110100101  001011010  001011010  110100101  001011010
    2   001011010  110100101  001011010  001011010  001011010  110100101
    3   001011010  1***0***1  110100101  110100101  001011010  0***1***0
    4   0***1***0  001011010  110100101  0***1***0  110100101  001011010
    5   110100101  001011010  110100101  001011010  001011010  110100101

BIT PATTERN :    1 1 0 1 0 0 1 0 1 1
CHANNEL SET :    F
DSYNCH      :  [  6   0  -2   0  -2   0  -2   0 ]
    0   101001011  101001011  101001011  101001011  101001011  101001011
    1   001011010  110100101  110100101  110100101  001011010  001011010
    2   001011010  110100101  001011010  001011010  001011010  110100101
    3   110100101  1***0***1  001011010  001011010  110100101  0***1***0
    4   0***1***0  001011010  110100101  0***1***0  110100101  001011010
    5   110100101  001011010  110100101  001011010  001011010  110100101
```

FIG.10.

```
BIT PATTERN :    0 1 0 0 1 0 1 1 0 1
CHANNEL SET :    A
DSYNCH      :  [ 6  0 -2  0 -2  0 -2  0 ]
   0    100101101 100101101 100101101 100101101 100101101 100101101
   1    010010110 010010110 101101001 101101001 101101001 010010110
   2    101101001 101101001 010010110 101101001 101101001 010010110
   3    0*1 101101001 010010110 1*0 010010110 101101001
   4    1*0 010010110 101101001 1*0 010010110 101101001
   5    101101001 010010110 010010110 010010110 101101001 101101001

BIT PATTERN :    0 1 0 0 1 0 1 1 0 1
CHANNEL SET :    B
DSYNCH      :  [ 6  0 -2  0 -2  0 -2  0 ]
   0    100101101 100101101 100101101 100101101 100101101 100101101
   1    010010110 010010110 101101001 101101001 010010110 101101001
   2    101101001 101101001 010010110 101101001 010010110 101101001
   3    101101001 0*1 010010110 010010110 101101001 1*0
   4    1*0 010010110 101101001 1*0 101101001 010010110
   5    010010110 101101001 010010110 101101001 101101001 010010110

BIT PATTERN :    0 1 0 0 1 0 1 1 0 1
CHANNEL SET :    C
DSYNCH      :  [ 6  0 -2  0 -2  0 -2  0 ]
   0    100101101 100101101 100101101 100101101 100101101 100101101
   1    101101001 010010110 010010110 010010110 101101001 101101001
   2    101101001 101101001 010010110 101101001 010010110 101101001
   3    010010110 0*1 101101001 101101001 010010110 1*0
   4    1*0 010010110 101101001 1*0 101101001 010010110
   5    010010110 101101001 010010110 101101001 101101001 010010110

BIT PATTERN :    0 1 0 0 1 0 1 1 0 1
CHANNEL SET :    D
DSYNCH      :  [ 6  0 -2  0 -2  0 -2  0 ]
   0    100101101 100101101 100101101 100101101 100101101 100101101
   1    010010110 101101001 010010110 101101001 010010110 101101001
   2    101101001 101101001 010010110 101101001 101101001 010010110
   3    0*1 010010110 101101001 1*0 101101001 010010110
   4    1*0 010010110 101101001 1*0 010010110 101101001
   5    101101001 010010110 010010110 010010110 101101001 101101001

BIT PATTERN :    0 1 0 0 1 0 1 1 0 1
CHANNEL SET :    E
DSYNCH      :  [ 6  0 -2  0 -2  0 -2  0 ]
   0    100101101 100101101 100101101 100101101 100101101 100101101
   1    010010110 010010110 101101001 101101001 010010110 101101001
   2    101101001 010010110 101101001 101101001 101101001 010010110
   3    101101001 0*1 010010110 010010110 101101001 1*0
   4    1*0 101101001 010010110 1*0 010010110 101101001
   5    010010110 101101001 010010110 101101001 101101001 010010110

BIT PATTERN :    0 1 0 0 1 0 1 1 0 1
CHANNEL SET :    F
DSYNCH      :  [ 6  0 -2  0 -2  0 -2  0 ]
   0    100101101 100101101 100101101 100101101 100101101 100101101
   1    101101001 010010110 010010110 010010110 101101001 101101001
   2    101101001 010010110 101101001 101101001 101101001 010010110
   3    010010110 0*1 101101001 101101001 010010110 1*0
   4    1*0 101101001 010010110 1*0 010010110 101101001
   5    010010110 101101001 010010110 101101001 101101001 010010110
```

FIG.11.

```
BIT PATTERN :    1 1 1 0 0 1 1 0 0 0
CHANNEL SET :    A
DSYNCH      :  [  6   0  -2   0  -2   0  -2   0 ]
   0    110011000  110011000  110011000  110011000  110011000  110011000
   1    111001100  111001100  000110011  000110011  000110011  111001100
   2    000110011  000110011  111001100  000110011  000110011  111001100
   3    11*0*1*00  000110011  111001100  00*1*0*11  111001100  000110011
   4    00*1*0*11  111001100  000110011  00*1*0*11  111001100  000110011
   5    000110011  111001100  111001100  111001100  000110011  000110011

BIT PATTERN :    1 1 1 0 0 1 1 0 0 0
CHANNEL SET :    B
DSYNCH      :  [  6   0  -2   0  -2   0  -2   0 ]
   0    110011000  110011000  110011000  110011000  110011000  110011000
   1    111001100  111001100  000110011  000110011  111001100  000110011
   2    000110011  000110011  111001100  000110011  111001100  000110011
   3    000110011  11*0*1*00  111001100  111001100  000110011  00*1*0*11
   4    00*1*0*11  111001100  000110011  00*1*0*11  000110011  111001100
   5    111001100  000110011  111001100  000110011  000110011  111001100

BIT PATTERN :    1 1 1 0 0 1 1 0 0 0
CHANNEL SET :    C
DSYNCH      :  [  6   0  -2   0  -2   0  -2   0 ]
   0    110011000  110011000  110011000  110011000  110011000  110011000
   1    000110011  111001100  111001100  111001100  000110011  000110011
   2    000110011  000110011  111001100  000110011  111001100  000110011
   3    111001100  11*0*1*00  000110011  000110011  111001100  00*1*0*11
   4    00*1*0*11  111001100  000110011  00*1*0*11  000110011  111001100
   5    111001100  000110011  111001100  000110011  000110011  111001100

BIT PATTERN :    1 1 1 0 0 1 1 0 0 0
CHANNEL SET :    D
DSYNCH      :  [  6   0  -2   0  -2   0  -2   0 ]
   0    110011000  110011000  110011000  110011000  110011000  110011000
   1    111001100  000110011  111001100  000110011  111001100  000110011
   2    000110011  000110011  111001100  000110011  000110011  111001100
   3    11*0*1*00  111001100  000110011  00*1*0*11  000110011  111001100
   4    00*1*0*11  111001100  000110011  00*1*0*11  111001100  000110011
   5    000110011  111001100  111001100  111001100  000110011  000110011

BIT PATTERN :    1 1 1 0 0 1 1 0 0 0
CHANNEL SET :    E
DSYNCH      :  [  6   0  -2   0  -2   0  -2   0 ]
   0    110011000  110011000  110011000  110011000  110011000  110011000
   1    111001100  111001100  000110011  000110011  111001100  000110011
   2    000110011  111001100  000110011  000110011  000110011  111001100
   3    000110011  11*0*1*00  111001100  111001100  000110011  00*1*0*11
   4    00*1*0*11  000110011  111001100  00*1*0*11  111001100  000110011
   5    111001100  000110011  111001100  000110011  000110011  111001100

BIT PATTERN :    1 1 1 0 0 1 1 0 0 0
CHANNEL SET :    F
DSYNCH      :  [  6   0  -2   0  -2   0  -2   0 ]
   0    110011000  110011000  110011000  110011000  110011000  110011000
   1    000110011  111001100  111001100  111001100  000110011  000110011
   2    000110011  111001100  000110011  000110011  000110011  111001100
   3    111001100  11*0*1*00  000110011  000110011  111001100  00*1*0*11
   4    00*1*0*11  000110011  111001100  00*1*0*11  111001100  000110011
   5    111001100  000110011  111001100  000110011  000110011  111001100
```

METHOD OF RECEIVING UNSOLICITED MESSAGES ON AN ELECTRICAL DISTRIBUTION NETWORK COMMUNICATIONS SYSTEM

BACKGROUND OF THE INVENTION

This invention relates to communications over electrical power distribution systems and, more particularly, to a method of processing unsolicited inbound communications over such a system.

Much work has been done on two-communications systems (TWACS) by which information in the form of instructions, data, etc. is transmitted throughout an electrical power distribution network. See, for example, U.S. Pat. Nos. 5,198, 796, 4,996,513, 4,963,853, 4,918,422, 4,904,995 and 4,658, 238, which are assigned to the same assignee as the present invention. As is described in these patents, both outbound communications; i.e., instructional signals sent from a transmitter to a remote transponder, and inbound signals; i.e., response signals or data returned from the remote site back to the transmission point have been realized. This communication involves modulation of the power frequency voltage for outbound communications, and power frequency current modulation for inbound communications. TWACS therefore provides an infrastructure for demand side management and distribution automation.

One advantage of communications using TWACS is its ability to control time related, scheduled, operator controlled functions. These include, for example, load control, capacitor bank switching, remote reader reading, scramming, etc. Another advantage has been the ability to poll remote locations to ascertain the current operational status at the site or the surrounding points tied into that site. For example, the site may be a distribution network substation and the surrounding points stores or houses to which electricity is directed from the substation. Polling of the substation includes monitoring the status of circuit breakers to check for overload conditions, for example.

To be of use, this polling activity must be constant. However, many events at remote locations happen unpredictably. A fire at a customer's home or store, a sudden overload, emergency switching, transformer failure due to overheating, or similar events impact the distribution network. In switching, for example, a whole section of the distribution network may be disconnected and transferred from one substation to another. It would be advantageous if the TWACS were able to monitor any of these occurrences without having to poll the network at regular intervals since this would allow for better control of the network without having to be constantly on the alert for a particular condition.

SUMMARY OF THE INVENTION

Among the several objects of the present invention may be noted the provision of a TWACS having the capability of monitoring for unsolicited inbound communications, these communications providing current information concerning a power distribution system with which the TWACS is used; the provision of such a TWACS which is capable of processing an unsolicited inbound communication regardless of whether the TWACS is engaged in two-way communication at the time the inbound communication is received, or not; the provision of such a TWACS to quickly and efficiently synchronize with the communication so no intelligence in the communication is lost regardless of the time or distribution network phase on which the message appears; the provision of such a TWACS to employ a multi-channel communication system and to assign an unsolicited message to a channel which is unused at the time the message is received; the provision of such a TWACS to readily distinguish the message from noise so to synchronize with the message; the provision of such a TWACS to affix a preamble of several binary bits to each unsolicited message thereby providing a receiver a synchronization input with the message; the provision of such a TWACS to employ a detection algorithm which is useful in decoding the unsolicited message to obtain the information contained therein, the algorithm being universally applicable; and, the provision of such a TWACS in which the capability of detecting and decoding unsolicited inbound messages is readily added to existing TWACS' capabilities.

In accordance with the invention, generally stated, a two-way communication system (TWACS) is used with an electrical power distribution network. The TWACS provides both outbound and inbound messages to and from remote network locations. A method of detecting and decoding unsolicited inbound messages from remote locations first involves generating the message in response to a time independent event occurring at the remote location. Formation of the message includes both generating a series of message bits, each of which has a prescribed format, and affixing a preamble to the front end of the message which comprises a plurality of bits arranged in a predetermined pattern. The message is then transmitted over any one of a plurality of communication channels normally used for two-way communications. Since the event triggering the unsolicited inbound message is independent of time, the time of transmission is random. The message is received at a receiving site, receipt of the message including receipt of the bits comprising the preamble together with bits comprising the message. The bits forming the preamble are detected, their detection signaling the fact an unsolicited message is being received. Preamble bit detection also initiates synchronization of operation of the TWACS to decode the contents of the message. Other objects and features will be in part apparent and in part pointed out hereinafter.

BRIEF DESCRIPTION OF THE DRAWINGS

FIGS. 8–12 are decoded values for a particular set of binary bits for various sets of TWACS' channels; and, FIG. 13 is a block diagram of a portion of a TWACS for synchronizing a TWACS receiver to receive and decode an inbound unsolicited message.

DESCRIPTION OF A PREFERRED EMBODIMENT

Figures 1, 2, 3:
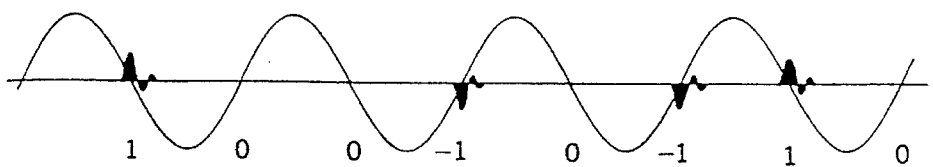
FIG. 1 represents a typical bit pattern for TWACS communication channel.
FIG. 2 illustrates use of an "01" binary bit message preamble pattern for synchronization purposes.
FIG. 3 represents two bit preamble functions for all channels in one channel set of the TWACS.
Figure 13:
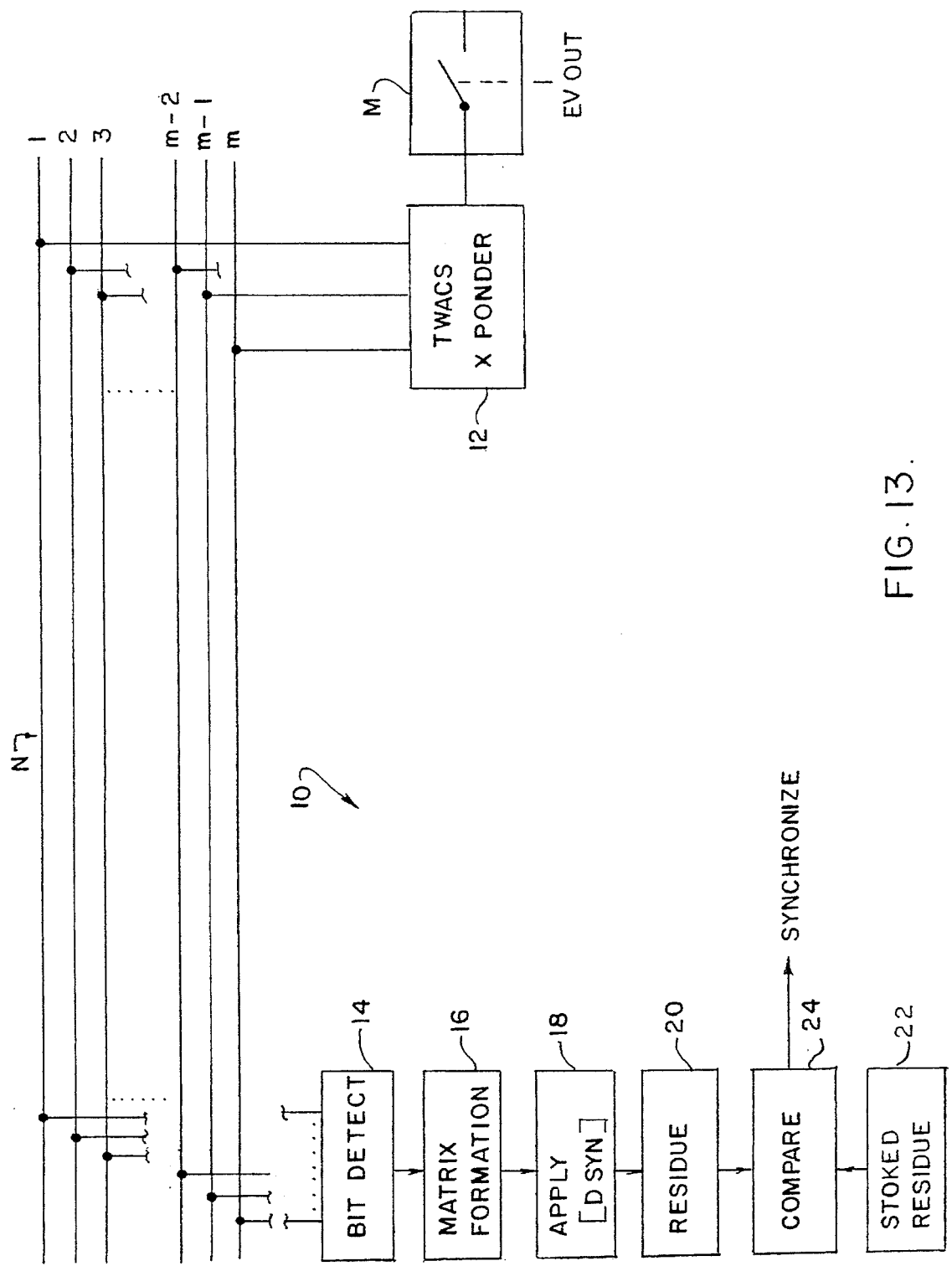

Referring to FIG. 1, a typical TWACS communications pulse pattern is shown with a 60 Hz. sine wave such as is propagated through a power distribution network N. As shown, the pulse patterns are produced at zero-crossing points of the 60 Hz. wave and represent bit values of 1, 0, and −1. The values 1 and −1 represent presence of a pulse at a zero-crossing point, with the sign indicating the pulse's polarity. The 0 value represents the absence of a pulse at the zero-crossing point. The manner in which these pulse patterns are produced and superimposed on the 60 Hz. wave are described in various of the coassigned U.S. Pat. Nos. 5,198, 796, 4,996,513, 4,963,853, 4,918,422, 4,904,995 and 4,658, 238, the teachings of which are incorporated herein by reference. Briefly, however, it will be understood that network N has n TWACS communication channels as shown in FIG. 13. The TACS has a transmitter/receiver 10 at one location on the network, and a remote transponder 12 at a different location. Unit 10 may, for example, be at the main distribution substation for the network, and the transponder at a distribution transformer. Though not shown, the transmitter portion of unit 10 sends messages to the transponder over one of the communications channels. The transponder sends a reply message back to the receiver portion of unit 10.

The pulse pattern of FIG. 1 can, for example, be expressed as a mathematical matrix [S1]. That is:

[S1]=[1 0 0 −1 0 −1 1 0].

If the pulse pattern shown in FIG. 1, is defined to represent a binary bit "1" value, then a binary "0" value can be defined as:

[S0]=[0 −1 1 0 1 0 0 −1].

That is, matrix [S0] is the complement of matrix [S1]. A third matrix, called a detection matrix, has also been defined. This matrix is represented as:

[D]=[1 1 −1 −1 −1 −1 1 1].

This matrix is defined such that when matrix [S1] and matrix [D] are mathematically combined, the resultant value is +4. Correspondingly, when matrix [S0] is mathematically combined with matrix [D], the resultant value is −4. Further, matrix [D], when properly synchronized with the 60 Hz. frequency, acts as a comb filter. This means the 60 Hz. frequency, and all its integer, multiple harmonics, if constant, are filtered out. For inbound TWACS communication, the pulses are imposed on the current waveform. By filtering, the current frequency and its harmonics are disregarded, and only the presence or absence of pulses need to be monitored.

It has been found that if a TWACS includes four pulses within eight half-cycles of the 60 Hz. wave, with no more than two consecutive pulses having the same polarity +, −, or none; eighteen pulse patterns can be constructed. There are then an additional eighteen complementary pulse patterns, for a total of thirty-six pulse patterns. In addition, there are eighteen detection pulse patterns, one for each complementary pair of pulse patterns. As above, combining a particular pulse pattern, or its complement, with the detection pattern, will produce an output of +4 or −4. Each relational set of matrices [S0], [S1], and [D], defines an inbound TWACS communication channel.

The TWACS has, for example, eighteen possible communication channels; i.e., n=18. From these eighteen channels, six sets of six channels are formed. These channels are referred to as channel sets A–F respectively. It is a property of each channel set that the members of the set are orthogonal. This is defined in the table below as follows:

| Channel # | Detection Algorithm | | | | | | | | | Bit "1" Pulse Pattern | | | | | | | |
|---|---|---|---|---|---|---|---|---|---|---|---|---|---|---|---|---|---|
| *Channel set A* | | | | | | | | | | | | | | | | | |
| 1  | 1 | −1 | 1  | −1 | −1 | 1  | −1 | 1 | 1 | −1 | 1  | −1 | 0  | 0  | 0  | 0  |
| 6  | 1 | −1 | −1 | 1  | 1  | −1 | −1 | 1 | 1 | −1 | 0  | 0  | 1  | −1 | 0  | 0  |
| 9  | 1 | −1 | −1 | 1  | −1 | 1  | 1  | −1| 1 | −1 | 0  | 0  | 0  | 0  | 1  | −1 |
| 12 | 1 | 1  | 1  | 1  | −1 | −1 | −1 | −1| 1 | 0  | 1  | 0  | 0  | −1 | 0  | −1 |
| 14 | 1 | 1  | −1 | −1 | 1  | 1  | −1 | −1| 1 | 0  | 0  | −1 | 1  | 0  | 0  | −1 |
| 15 | 1 | 1  | −1 | −1 | −1 | −1 | 1  | 1 | 1 | 0  | 0  | −1 | 0  | −1 | 1  | 0  |
| *Channel set B* | | | | | | | | | | | | | | | | | |
| 2  | 1 | −1 | 1  | 1  | −1 | −1 | −1 | 1 | 1 | −1 | 1  | 0  | 0  | −1 | 0  | 0  |
| 4  | 1 | −1 | −1 | −1 | 1  | 1  | −1 | 1 | 1 | −1 | 0  | −1 | 1  | 0  | 0  | 0  |
| 9  | 1 | −1 | −1 | 1  | −1 | 1  | 1  | −1| 1 | −1 | 0  | 0  | 0  | 0  | 1  | −1 |
| 11 | 1 | 1  | 1  | −1 | −1 | 1  | −1 | −1| 1 | 0  | 1  | −1 | 0  | 0  | 0  | −1 |
| 15 | 1 | 1  | −1 | −1 | −1 | −1 | 1  | 1 | 1 | 0  | 0  | −1 | 0  | −1 | 1  | 0  |
| 17 | 1 | 1  | −1 | 1  | 1  | −1 | 1  | −1| 1 | 0  | 0  | 0  | 1  | −1 | 0  | −1 |
| *Channel set C* | | | | | | | | | | | | | | | | | |
| 3  | 1 | −1 | 1  | 1  | −1 | 1  | −1 | −1| 1 | −1 | 1  | 0  | 0  | 0  | 0  | −1 |
| 4  | 1 | −1 | −1 | −1 | 1  | 1  | −1 | 1 | 1 | −1 | 0  | −1 | 1  | 0  | 0  | 0  |
| 8  | 1 | −1 | −1 | 1  | 1  | −1 | 1  | 1 | 1 | −1 | 0  | 0  | 0  | −1 | 1  | 0  |
| 10 | 1 | 1  | 1  | −1 | −1 | −1 | −1 | 1 | 1 | 0  | 1  | −1 | 0  | −1 | 0  | 0  |
| 16 | 1 | 1  | −1 | −1 | −1 | 1  | 1  | −1| 1 | 0  | 0  | −1 | 0  | 0  | 1  | −1 |
| 17 | 1 | 1  | −1 | 1  | 1  | −1 | −1 | −1| 1 | 0  | 0  | 0  | 1  | −1 | 0  | −1 |
| *Channel set D* | | | | | | | | | | | | | | | | | |
| 1  | 1 | −1 | 1  | −1 | −1 | 1  | −1 | 1 | 1 | −1 | 1  | −1 | 0  | 0  | 0  | 0  |
| 7  | 1 | −1 | −1 | 1  | 1  | 1  | −1 | −1| 1 | −1 | 0  | 0  | 1  | 0  | 0  | −1 |
| 8  | 1 | −1 | −1 | 1  | −1 | 1  | 1  | 1 | 1 | −1 | 0  | 0  | 0  | −1 | 1  | 0  |
| 12 | 1 | 1  | 1  | 1  | −1 | −1 | −1 | −1| 1 | 0  | 1  | 0  | 0  | −1 | 0  | −1 |
| 13 | 1 | 1  | −1 | −1 | 1  | −1 | −1 | 1 | 1 | 0  | 0  | −1 | 1  | −1 | 0  | 0  |
| 16 | 1 | 1  | −1 | −1 | −1 | 1  | 1  | −1| 1 | 0  | 0  | −1 | 0  | 0  | 1  | −1 |
| *Channel set E* | | | | | | | | | | | | | | | | | |
| 2  | 1 | −1 | 1  | −1 | −1 | 1  | −1 | 1 | 1 | −1 | 1  | −1 | 0  | 0  | 0  | 0  |
| 5  | 1 | −1 | −1 | −1 | 1  | 1  | 1  | −1| 1 | −1 | 0  | −1 | 0  | 0  | 1  | 0  |
| 7  | 1 | −1 | −1 | 1  | 1  | 1  | −1 | −1| 1 | −1 | 0  | 0  | 1  | 0  | 0  | −1 |

| Channel # | Detection Algorithm | | | | | | | | | Bit "1" Pulse Pattern | | | | | | |
|---|---|---|---|---|---|---|---|---|---|---|---|---|---|---|---|---|
| 11 | 1 | 1 | 1 | −1 | −1 | 1 | −1 | −1 | 1 | 0 | 1 | −1 | 0 | 0 | 0 | −1 |
| 13 | 1 | 1 | −1 | −1 | 1 | −1 | −1 | 1 | 1 | 0 | 0 | −1 | 1 | −1 | 0 | 0 |
| 18 | 1 | 1 | −1 | 1 | −1 | −1 | 1 | −1 | 1 | 0 | 0 | 0 | 0 | −1 | 1 | −1 |
| Channel set F | | | | | | | | | | | | | | | | |
| 3 | 1 | −1 | 1 | 1 | −1 | 1 | −1 | −1 | 1 | −1 | 1 | 0 | 0 | 0 | 0 | −1 |
| 5 | 1 | −1 | −1 | −1 | −1 | 1 | 1 | 1 | 1 | −1 | 0 | −1 | 0 | 0 | 1 | 0 |
| 6 | 1 | −1 | −1 | 1 | 1 | −1 | −1 | 1 | 1 | −1 | 0 | 0 | 1 | −1 | 0 | 0 |
| 10 | 1 | 1 | 1 | −1 | −1 | −1 | −1 | 1 | 1 | 0 | 1 | −1 | 0 | −1 | 0 | 0 |
| 14 | 1 | 1 | −1 | −1 | 1 | 1 | −1 | −1 | 1 | 0 | 0 | −1 | 1 | 0 | 0 | −1 |
| 18 | 1 | 1 | −1 | 1 | −1 | −1 | 1 | −1 | 1 | 0 | 0 | 0 | 0 | −1 | 1 | −1 |

The elements comprising a channel can be consecutively labelled so to form the following:

[Djk], [Sjk1], [Sjk0], where j represents the channel set A, B, . . . , F, and k represents one of the six channels comprising the set and has a value of 1, 2, . . . , 6, (1 being the first or lowest number channel in the set, and 6 the last or highest number channel therein). For this arrangement, the following relationships are true:

$[Djm]*[Sjn1]$ = +4, if $m = n$, and
= 0, if $m <> n$.

And, $[Djm]*[Sjn0]$ = −4, if $m = n$, and
= 0, if $m <> n$.

$$[Dysn]*[Sjm] = [Dj1] * [Sjm] +\ldots+ [Djm] * [Sjm] +\ldots+ [Dj6] * [Sjm], \text{ or}$$
$$= 0 +\ldots+ 4 +\ldots+ 0, \text{ or}$$
$$= +4.$$

For the detection process described in various of the above referenced patents, a +4 indicates a binary bit "1", and a −4, a binary bit "0". This is important because it allows the TWACS to be configured so, if properly synchronized, up to six different inbound messages can be simultaneously received; i.e., different messages can be simultaneously received on each separate channel of a channel set. The separate detection algorithms for each channel are then used to separate and decode each message. The above table lists the detection algorithm and binary bit "1" pulse pattern for each channel in each set.

It will be appreciated that the transmission of outbound messages and corresponding receipt of an anticipated response, or incoming messages over the TWACS is not a constant activity. Also, while normal two-way communications ties up various channels of a channel sets when no scheduled activity is taking place, each channel of each set is available for receipt of an unsolicited inbound message. Such a message may be generated, for example, when a monitor M is triggered by occurrence of an event the monitor is set-up to record. In such circumstances, monitor M triggers operation of transponder 12 to generate and send an inbound message over a communication channel n. Because the inbound message is not sent in response to a transmission from unit 10, it is considered an unsolicited message. Further, rather than having a separate detection algorithm for each separate channel, the method of the present invention employs a single detection algorithm applicable to all channels. Besides the fact that no on-going communications makes use of a single algorithm practical, because the inbound communication is an unsolicited one, the probability of two such messages occurring simultaneously is remote.

Assume, for example, that a "1" bit is transmitted over one of the communication channels m in a set j of channels. Applying the above stated relationship:

$[Djm]*[Sjm] = +4$.

And, since $n <> m$, $[Djn]*[Sjm] = 0$.

If we now define a new mathematical relationship:

[Dsyn]=[[Dj1]+[Dj2]+[Dj3]+[Dj4]+[Dj5]+[Dj6]], it can be mathematically shown that:

By repeating this operation for each channel set, the elements of [Dsyn] is obtained by summing the row matricees for the six detection algorithms for the set. Again, these algorithms are listed above. It will be found that [Dsyn] for all channel sets is identical and the matrix is expressed as:

[Dsyn]=[6 0 −2 0 −2 0 −2 0].

Accordingly, it will be appreciated that [Dsyn] has the property of decoding any channel of any channel set. The uniqueness of this property is it allows any unsolicited inbound communication to be directed to any single channel when there is no scheduled activity taking place.

To process an unsolicited inbound communication, the message must first be synchronized with the TWACS. To do this, a TWACS receiver, using a substation reference voltage, samples current within a detection window. This is indicated by the bit detection module 14 of unit 10. The sampling technique is described in various of the patents referenced above. Sampled data is stored for eight consecutive half-cycles of the 60 Hz. waveform. A detection matrix is then produced, by matrix formation module 16 of unit 10, for the eight resulting data points. By continuing to sample at the consecutive half-cycle points, successive matricees can be formed. The first matrix, as noted, includes the first eight samples; the second matrix the second through ninth samples inclusively; the third matrix the third through tenth samples, etc. Each new input matrix has the newest detected bit as its lowest order bit in the matrix. And, the highest order bit from the previous matrix is discarded. The above defined detection matrix is applied to each data sample matrix as it is formed. This is indicated by module 18 of unit 10. Unless an unsolicited message has arrived and is reflected in a newly formed matrix, the residual from applying the detection matrix to each matrix is zero. The only factor which might produce a different residual value is the presence of noise.

This process of matrix formation and application of the detection matrix to it continues until an unsolicited message is received. When such a message arrives, it is typically preceded by a preamble. As shown in FIG. 2, the preamble is a two bit binary string "01". The TWACS processes the preamble bits in the same manner above described. That is, as the respective sampled strings are formed into matrices, the detection matrix is applied to them. FIG. 2 illustrates this by showing the bit stream across the top of the Fig., with the successive application of [Dsyn] to each eight bit sample matrix. The residue values are shown as the left hand column in the Fig. The residue stream from the succession of detection matrix applications is stored in a residue module 20 of unit 10. Note that for the first two matricees, the residue value is zero. From the start of the bit string for first bit "0". and then bit "1" the residue values range from +4 to −4 when [Dsyn] is applied to the sequence of matricees. As discussed hereinafter, this residue pattern is useful to synchronize the TWACS' receiver and message decoder with the incoming bit stream.

Because the preamble bit stream is prescribed for all messages, and because [Dsyn] is common to all channels of all channel sets, the residue pattern, if stored in a residue memory 20, can be compared with the ongoing residue pattern. When a pattern match is obtained, this event triggers synchronization. As shown in FIG. 13, the known residue pattern for a specified message preamble is stored in a module 22 of unit 10. Each time the detection algorithm is applied to a matrix, the resultant residue matrix is compared with that stored in module 22. If the results compare, it is indicative a preamble to a message has been received and the receiver portion of unit 10 can now be synchronized with the message contents.

The comparison of the stored residue matrix with the dynamic matrix (reformulated each time a new bit is processed by the receiver) is performed at a module 24 of unit 10. When a comparison is found, the output from module 24 signals the receiver to begin synchronization with the message content bits. The message is decoded by taking consecutive eight half-cycles of information using the inbound receiving techniques described in the referenced patents.

It will be appreciated that because of noise on the network and the distortions noise creates, residue matrix values will not necessarily be 0, +2, −2, +4, or −4, as indicated in FIG. 2. One way to overcome this potential problem would be to introduce some type of scaling factor. However, this approach has been found to be not necessarily helpful. A second approach is to define certain preamble functions, and to do so in such a way as to facilitate a pattern match when it occurs. In this regard, the following preamble function criteria are defined:

First, only residues with large magnitudes are used for the reference pattern;

second, all residues of zero magnitude are set to zero;

third, all residues whose magnitude equals two or less are set to zero;

fourth, all residues greater than two are set to one; and, fifth, all residues less than minus two are set to minus one.

Referring again to FIG. 2, the residue values extending down the left hand column of the Fig., are:

[0 0 2 −2 2 −4 2 −4 −4 2 2 4 4 −2 −2 4].

Applying the rules set out above, this residue matrix pattern converts to:

[0 0 0 0 0 −1 0 −1 −1 0 0 1 1 0 0 1].

The preamble used in the example of FIG. 2 corresponds, for example, with that used for communications channel 15 of communications set A. Accordingly, this preamble function is denoted P15(0,1). Referring to FIG. 3, the preamble functions for the channels in communication set A are shown. So long as the message preamble is the bit pattern 01, these patterns will pertain for all channels in the set.

It will be also understood that for the actual residues generated by the receiver portion of TWACS unit 10, several conversion techniques can be used. If, for example, the residue pattern is:

[R1 R2 R3 R4 ... R15 R16], an average value for the pattern can be calculated as:

Ravg.=[Abs(R1)+Abs(R2)+ ... +Abs(R15)+Abs(R16)]/16.

It is then possible to define a number $c$ such that $0 \quad c \quad 1$.

Now, if $Abs(Rj) <= c*Ravg$, then $Rj = 0$, for any $j$.

Also, if $Abs(Rj) > c*Ravg$, then $\quad Rj = 1$, if $Rj$ is positive, or
$\quad Rj = -1$, if $Rj$ is negative.

Both of these latter conditions persist for any $j$. Once the residue pattern is converted, it is compared with the reference residue pattern, as before.

Even though [Dsyn] allows all the communication channels n to be used, it is preferable if an inbound unsolicited communication is transmitted only over a selected channel. Further, it is also preferable if the message is confined to a specified number of bits and a specified bit pattern. The primary reason for this is it reduces the risk of a false synchronization which might occur under certain noise conditions. A perfect match is difficult to obtain under most noisy conditions. Therefore, even if a slightly imperfect match occurs, the TWACS should accommodate it. Assume the preamble conditions which are described above exist such that a residue match should occur. Under these conditions, a match might not occur if: a) the receiver in unit 10 is not in synchronism with the inbound transmitter of transponder 12; or, b) the receiver is in sync but noise contaminates the residue pattern.

While noise will typically cause some distortion, in extreme instances, the detected preamble bits will be read as 11. To provide a technique that allows for correct preamble identification even under adverse conditions, assume that the preamble includes N bits. For N bits, the total number of possible bit patterns is $2^N$. As described above, and as shown in FIG. 2, the preamble comprises eight bits. Therefore, the number of elements in the preamble function is 8*N.

Assume the elements of a preamble function are defined by the expression p(m,k,j) where:

i) m denotes the bit pattern number, and
m=1, 2, 3 ... $(2^N-1)$, $2^N$:

ii) k denotes the inbound channel number, and
k=1, 2, 3 . . . 17, 18;

iii) j denotes the element number of the preamble function, and
j=1, 2, 3 . . . (8*N−1 ), 8*N.

A new function is now produced. This function comprises an infinite number of elements and is constructed as follows:

$r(m,k,j)=0$, for $-\infty<j<0$ $r(m,k,j)=p(m,k,j)$, for $0<j<(2^N+1)$ $r(m,k,j)=0$, for $2^N<j<+\infty$.

If a convolution is performed for two of these functions, the result is:

$$CONV(m1, m2, k1, k2, i) = \sum_{j=-\infty}^{j=+\infty} r(m1, k1, j)*r(m2, k2, j-i).$$

If i=0, m1<>m2, and k1<>k2, then it can be mathematically shown that CONV(m1,m2,k1,k2,0) is a cross-correlation between r(m1,k1,j) and r(m2,k2,j). Also, if i=0, m1=m2, and k1=k2, then it can be mathematically shown that CONV(m1, m2,k1,k2,0) is an auto-correlation between r(m1,k1,j1) and itself. As a practical matter, if only one channel set A-F is used, then m can only have six values. For channel set A, for example, the channel values are k=1 6, 9, 12, 14, and 15.

Based on the foregoing, an ideal preamble function has the following properties:

$CONV(m1, m2, k1, k2, i)$ = 0, for any $i$;
$CONV(m1, m1, k1, k1, i)$ = $NE$, for $i = 0$; or,
= 0, for $i < > 0$, where NE is the number of non-zero elements in the preamble function. This cannot be accomplished using TWACS inbound pulse patterns. This is because secondary pulse peaks appear for i<> 0. However, because the preamble precedes the message, the real area of interest is for i>0.

Figure 7:
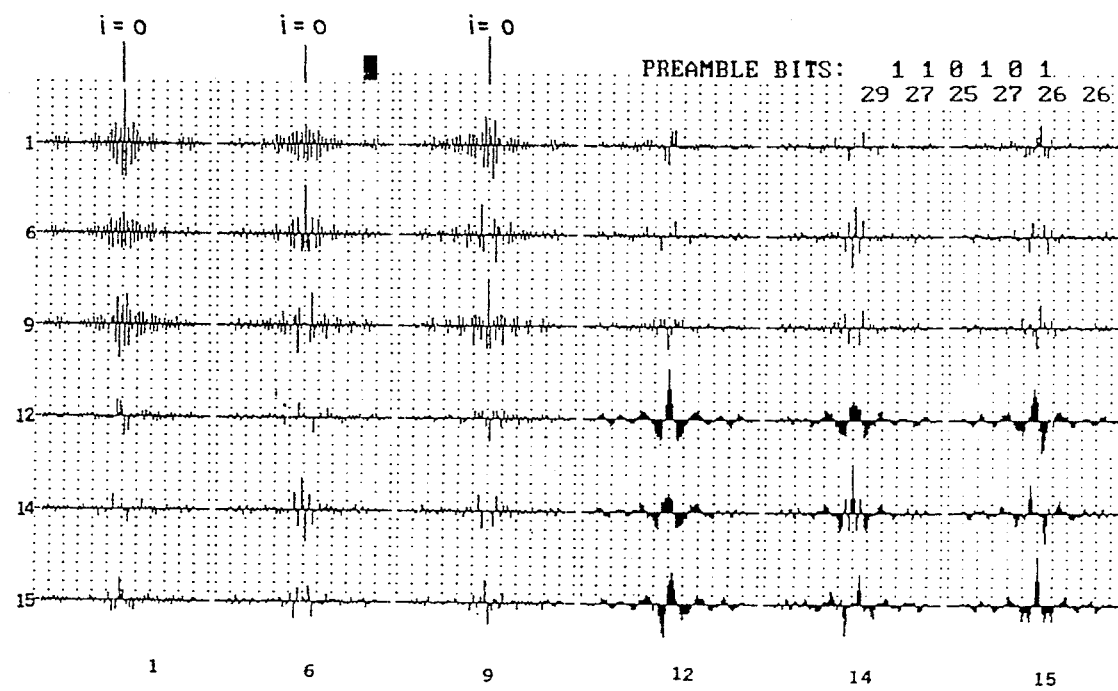

Referring to FIGS. 4–7, there are shown examples of CONV(m1,m2,k1,k2,i) for the respective channels of channel set A. It will be appreciated that for the 6-bit pattern discussed, there are sixty-four possible preamble bit patterns. The conversions shown in FIGS. 4–7 are for functions of i and represent the following preamble bit patterns: 000000 (FIG. 4), 001010 (FIG. 5), 010111 (.FIG. 6), and 110101 (FIG. 7). For each bit pattern m1=m2. Under this format, for

| | |
|---|---|
| 000000 | m1 = m2 = 1, |
| 001010 | m1 = m2 = 11, |
| 010111 | m1 = m2 = 24, and |
| 110101 | m1 = m2 = 54. |

In each instance, the number m1 or m2 is actually the decimal equivalent of the binary number representing the preamble, plus one.

Relating the above preamble function CONV(m1,m2,k1, k2,i) to FIGS. 4–7, the rows in each Fig., labelled 1, 6, 9, 12, 14, 15 represent the values for k1 in the function. The columns are also labelled 1, 6, 9, 12, 14, and 15, and represent the values for k2. For example, where row 6 and column 14 intersect, the plot graphically represents the function CONV(m1,m2,6,14,i). The peak of the plot shown in the respective Figs. occurs at i=0, and when m1=m2.

Figure 4:
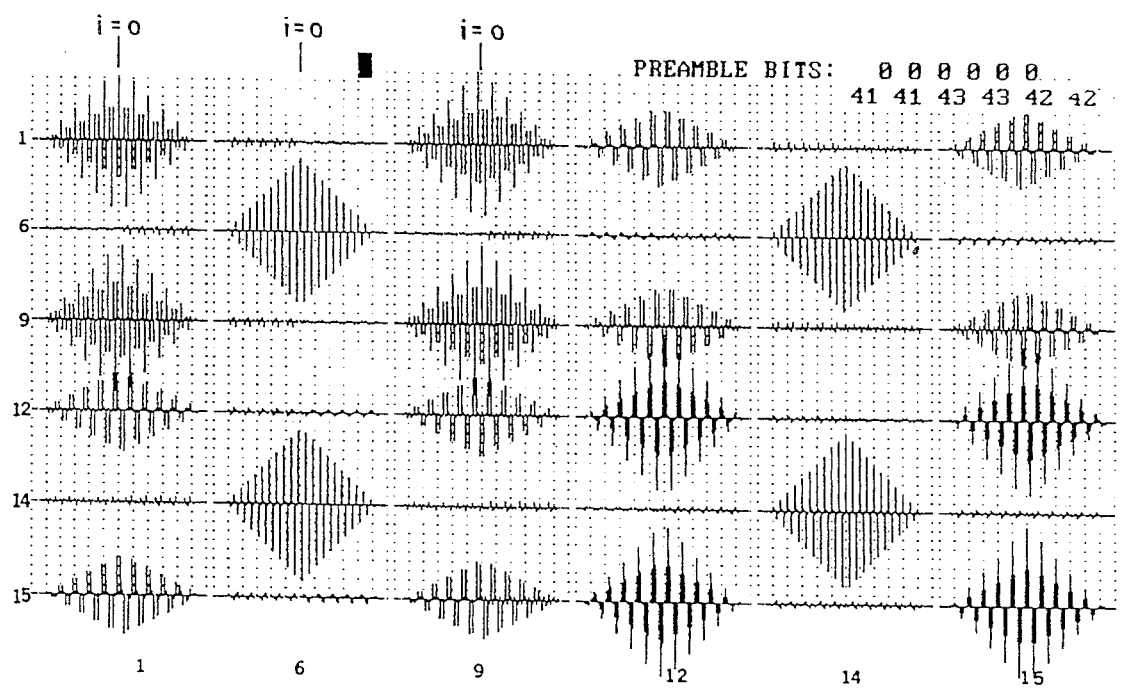
FIGS. 4–7 represents auto-correlation patterns for various binary bit patterns.

With respect to FIG. 4, one evident feature for the preamble bit pattern 000000 is the presence of too many secondary peaks whose amplitudes have approximately the same magnitude and sign as the main peak. This is problematical because noise could produce a "false" synchronization if the noise pattern too closely resembles one of the reference patterns. The preamble bit patterns 001010, 010111, and 110101 do not exhibit this problem and are therefore more logical choices for unsolicited inbound message use.

Figure 5:
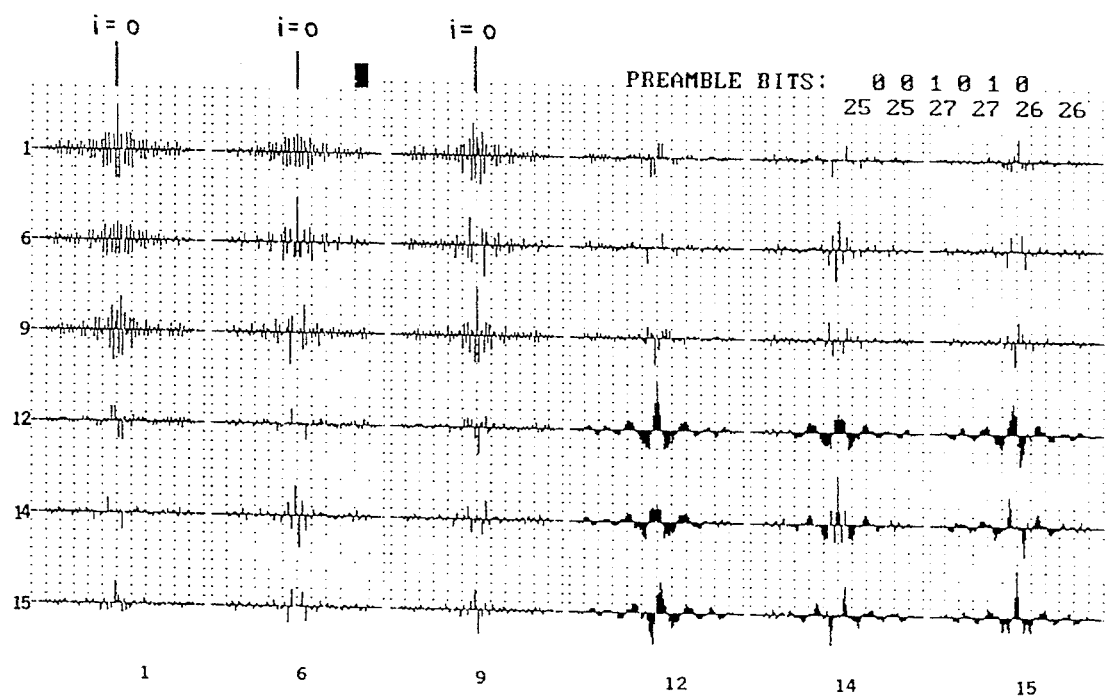
Figure 6:
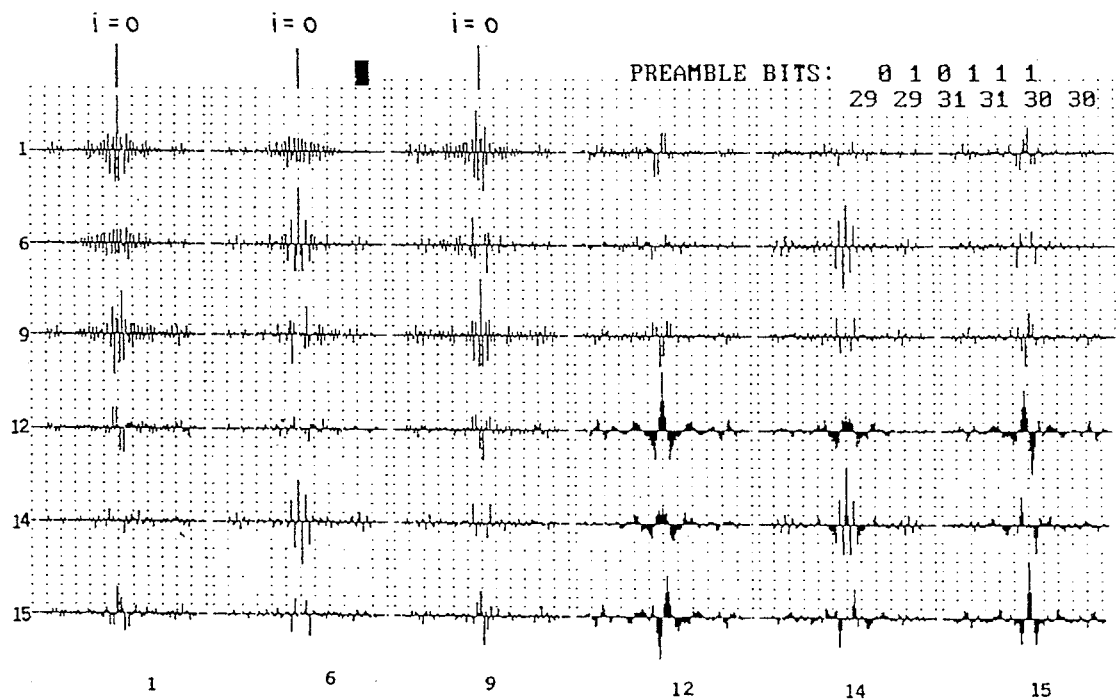

With respect to FIG. 5, for the bit pattern 001010, if channel 1 of channel set A is selected, there is a probability the pattern will match that of channel set 15 of the set. This is so if the pattern is one-half cycle out of synchronism. If the pattern is four cycles out of synchronism, then the pattern on channel 1 matches that on channel 9. Similar assessments provide other possible fault situations with respect to the other preamble bit patterns shown in FIGS. 6 and 7.

The above two examples illustrate that regardless of the preamble bit pattern which might be selected, these, or other potential problems exist. However, use of [Dsyn] can offset various of these undesirable possibilities. A study of [Dsyn] to counteract the possibility of a false synchronization was made based on the following assumptions:

1) the inbound receiver can detect signal strengths which are at least one-half the desired signal strength or higher;

2) the message comprised at least eight bits following the preamble bits and included an additional don't care" bit appended to the end of the message;

3) framing the signal pattern of the message starts 0, 1, 2, 3, 4, or 5 half-cycles prior to the start of the message. This simulates the message bits being a corresponding 0–5 half-cycles out of synchronism.

4) [Dsyn]=[6 0 −2 0 −2 0 −2 0]; and, 5) for a specific message pattern, all channels in each channel set are decided.

FIGS. 8–12 illustrate the results from applying [Dsyn] as outlined above. In the Figs., for each channel set A–F, the six columns of six rows represent the decoded values of the eight bit messages. In FIG. 8, the bit pattern is 1111111111. In FIG. 9, 1010101010. In FIG. 10, 1101001011. In FIG. 11, 0100101101. And, in FIG. 12, 1110011000. For each column, the respective rows indicate the message when it is received 0, 1, 2, 3, 4, and half-cycles out of synchronization. Also, the * in a message bit location indicates the signal strength of the bit was less than the one-half signal strength threshold value mentioned previously.

An examination of the received message bits as represented in FIGS. 8–12 indicates the following:

1) the real information contained in the message generally is found; however,
   a) the bits may be shifted by one bit position
   b) the message bits may be inverted. These two conditions are shown, for example, in FIGS. 10 and 11.

2) out of synchronization of two half-cycles can occur for all channels without loss of information.

3) In some channels in each channel set, there can be an out-of-sync condition of five half-cycles without information loss. These channels are:
   set A, channels 6, 9, 14, 15,
   set B, channels 9, 15,
   set C, channels 8, 19,
   set D, channels 7, 8, 13, 18,
   set E, channels 7, 13,
   set F, channels 6, 14.

Based on this analysis, one conclusion which can be drawn is that for noisy conditions, unsolicited inbound messages are best received over channel sets A or D.

From the foregoing mathematical formulations and test studies, TWACS 10 can best be used for the reception of unsolicited inbound communications:

1) only channel set A or D is used for the transmission. Channels 1 and 12 of the selected set should not be used. Otherwise, there is no need to specify which channel in either set should be used; since all the remaining channels in each set tolerate an out-of-sync condition of up to five half-cycles.

2) regardless of the inbound channel selected, the universal algorithm [Dsyn] should be used.

3) a preamble bit pattern should be decided upon, and used. The methods described above and involving convolution techniques should permit an appropriate pattern to be chosen. Again, however, patterns for channels 1 and 12 of sets A or D should not be used.

4) a "don't care" or random bit can be appended to the end of the message bits. By doing this, [Dsyn] tolerates out-of-sync conditions without loss of information.

5) added security is possible by using two-bit redundancy for the information bits in the message.

6) N1 preamble bits are usable without CRC-16 applied to them; however, CRC-16 is applied to the N2 information bits.

What has been described is a TWACS having the capability of monitoring for unsolicited inbound communications which provide current information concerning the power distribution system with which the TWACS is used. Importantly, the TWACS is capable of processing unsolicited inbound communications regardless of whether or not the TWACS is engaged in two-way communication at the time it receives an inbound communication. The TWACS quickly and efficiently synchronizes with the bit stream comprising the inbound communication so no intelligence in the communication is lost. This is done regardless of the time or distribution network phase on which the message appears. In operation, the TWACS employs a multi-channel communication system, and the TWACS assigns the unsolicited message to a channel which is unused at the time the message is received. The TWACS readily distinguishes the message from noise so to synchronize with the message, and it also affixes, as a preamble, several binary bits to each unsolicited message. This provides a receiver time to synchronize with the message. The TWACS employs a detection algorithm which is useful in decoding the unsolicited message to obtain the information contained in it. Synchronization is based upon detection of the message preamble. A detection algorithm for doing this is common to all communication channels. With respect to the detection process, a residue matrix is created for each detected bit and a comparison is made between this residue matrix and a reference residue matrix. Because of noise and other communication channel distortions, several techniques are presented for providing a residue matrix which accurately reflects the detected portions of the preamble. Finally, the capability of detecting and decoding unsolicited inbound messages is readily added to existing TWACS' capabilities.

In view of the foregoing, it will be seen that the several objects of the Invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. In a two-way communication system used with an electrical power distribution network, the communication system providing both outbound and inbound messages to and from remote network locations, a method of detecting and decoding unsolicited inbound messages from the remote locations comprising:

forming an unsolicited message at a remote location in response to the occurrence of a time independent event at that location, each message including a series of message bits each of which has a prescribed format, and a series of preamble bits arranged in a predetermined bit pattern at the beginning of the message;

transmitting the unsolicited message over any one of a plurality of selected communication channels normally used for two-way communications, said channels being selected for their relative immunity to noise;

receiving the unsolicited message at a receiving site, receiving the message including a receiver of the system being out of synchronization with the message, receipt of the message including first receiving the bits comprising the preamble, and then the bits comprising the message; and, detecting the bits comprising the preamble as an indication an unsolicited message is being received, detecting the bits including forming a matrix comprising a plurality of values derived from the detection of bits comprising the unsolicited message, the bit values within the matrix being arbitrarily set such that bits having a zero value are set at zero, bits having a value between zero and a first predetermined value are set at zero, bits having a value greater than the first predetermined value are set a second predetermined value, and bits having a value less than a fourth predetermined value are set at a fifth predetermined value thereby to compensate for the effects of noise on the power distribution network.

2. In a two-way communication system used with an electrical power distribution network, the communication system providing both outbound and inbound messages to and from remote network locations, a method of detecting and decoding unsolicited inbound messages from the remote locations comprising:

forming an unsolicited message at a remote location in response to the occurrence of a time independent event at that location, formation of the message including generating a series of message bits each of which has a prescribed format, and affixing a preamble comprising a plurality of bits arranged in a predetermined pattern to the beginning of the message;

transmitting the unsolicited message over any one of a plurality of communication channels normally used for two-way communications, the time of transmission being random since the event causing generation of the message is time independent;

receiving the unsolicited message at a receiving site, receipt of the message including first receiving the bits comprising the preamble, and then the bits comprising the message; and, detecting the bits comprising the preamble as an indication an unsolicited message is being received; synchronizing operation of the system with the messages based upon detection of the preamble bits detecting the bits including forming an input matrix based upon the bit values of a predetermined number of consecutive detected bits, and forming sequential input matricees with a new input matrix being formed each time the next bit is detected, each new input matrix including the newly detected bit as the lowest order bit with the highest order bit from the previous input matrix being discarded, and, applying a predetermined detection matrix to each input matrix regardless of the communication channel over which the unsolicited message is transmitted to produce a residue matrix, with values in the residue matrix being determined such that all residue values therein having a first value are set to a first predetermined magnitude, all residue values less than a second value are also set to the first predetermined magnitude, all values greater than the second value are set to a second predetermined magnitude, and all value less than a third value are set to a third predetermined value, thereby to adjust the residue values in the residue matrix to compensate for the effects of noise on the power distribution network.

3. The method of claim 2 wherein detecting the bits comprises monitoring pulses imposed on the current waveform of the distribution network when the message is generated.

4. The method of claim 3 wherein size of the input matrix the detection matrix and the resulting residue matrix corresponds to the number of pulses comprising the message preamble.

5. The method of claim 4 further including storing the residue matrix.

6. The method of claim 5 further including comparing the stored residue matrix with each residue matrix created by applying the detection matrix to an input matrix.

7. The method of claim 6 further including initiating synchronization of the network with the bits comprising the message contents when the value of the stored residue matrix compares with that of a residue matrix created when the detection matrix is applied to an input matrix, the comparison indicating a message preamble has been detected.

8. The method of claim 7 wherein the bit values of the stored residue matrix are commonly adjusted with those of the actual residue matricees.

9. The method of claim 7 further including setting the residue matrix bit values to predetermined values as a function of the absolute value of each bit.

10. The method of claim 9 further including setting the residue matrix bit values as a function of a calculated average value of the residue matrix.

11. The method of claim 1 wherein receiving the message includes being out of synchronization with the message by up to five half-cycles.

12. In a two-way communication system used with an electrical power distribution network, the communication system providing both outbound and inbound messages to and from remote network locations, a method of detecting and decoding unsolicited inbound messages from the remote locations comprising:

forming an unsolicited message at a remote location in response to the occurrence of a time independent event at that location, each message including a series of message bits each of which has a prescribed format, and a series of preamble bits arranged in a predetermined bit pattern at the beginning of the message;

transmitting the unsolicited message over any one of a plurality of selected communication channels normally used for two-way communications, said channels being selected for their relative immunity to noise, and the respective bits comprising the preamble and the message comprising pulses imposed on a current waveform of the distribution network;

receiving the unsolicited message at a receiving site, receipt of the message including first receiving the bits comprising the preamble, and then receiving the bits comprising the message; and, synchronizing a receiver of the system with the message by detecting the bits comprising the preamble, said detecting including:

monitoring the pulses imposed on the current waveform; forming a series of input matricees based upon the bit values of a predetermined number of consecutively detected bits, each input matrix including a predetermined number of bits with a new input matrix being formed each time the next bit is detected whereby the new input matrix includes the newly detected bit as the lowest order bit, the highest order bit from the previous input matrix being discarded;

applying a detection matrix to each input matrix and calculating a residue matrix in response thereto;

storing a residue matrix comprising values corresponding to the residue matrix created when the detection matrix is applied to an input matrix whose contents comprise the message preamble;

comparing the stored residue matrix with each residue matrix created by applying the detection matrix to an input matrix; and, initiating synchronization of the system with the bits comprising the message contents when the value of the stored residue matrix compares with that of a residue matrix created when the detection matrix is applied to an input matrix, the comparison indicating a message preamble has been detected wherein values in the residue matrix are determined by arbitrarily assigning bits having a value of zero or a value less than a first predetermined value a value of zero, bits having a value greater than the first predetermined value a second predetermined value, and a value less than a third predetermined value a fourth predetermined value.

* * * * *